(12) United States Patent
Eversdijk et al.

(10) Patent No.: US 8,178,211 B2
(45) Date of Patent: May 15, 2012

(54) TREATMENT OF WOOD

(75) Inventors: Jacobus Eversdijk, Den Bosch (NL); Michael Fritz Sailer, Pijnacker (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 0 days.

(21) Appl. No.: 12/518,996

(22) PCT Filed: Dec. 17, 2007

(86) PCT No.: PCT/NL2007/050658
§ 371 (c)(1), (2), (4) Date: Oct. 2, 2009

(87) PCT Pub. No.: WO2008/072967
PCT Pub. Date: Jun. 19, 2008

(65) Prior Publication Data
US 2010/0047603 A1    Feb. 25, 2010

(30) Foreign Application Priority Data
Dec. 15, 2006  (EP) ................................. 06077266

(51) Int. Cl.
*B32B 23/08* (2006.01)
(52) U.S. Cl. .................... 428/537.1; 428/536; 427/393; 427/440
(58) Field of Classification Search ............. 428/537.1, 428/536; 427/393, 440
See application file for complete search history.

(56) References Cited

U.S. PATENT DOCUMENTS

| | | | | |
|---|---|---|---|---|
| 3,579,369 A | * | 5/1971 | Foster | 427/303 |
| 3,694,418 A | * | 9/1972 | Fock et al. | 526/265 |
| 4,420,542 A | * | 12/1983 | Sowers | 428/541 |
| 2002/0192400 A1 | | 12/2002 | Schneider | |
| 2004/0234492 A1 | | 11/2004 | Stockel | |

FOREIGN PATENT DOCUMENTS

| | | | |
|---|---|---|---|
| DE | 1920591 A1 | | 11/1970 |
| EP | 0591806 A1 | | 4/1994 |
| EP | 0895839 | * | 2/1999 |
| EP | 0895839 A1 | | 2/1999 |
| GB | 846 680 A | | 8/1960 |
| GB | 846680 | * | 8/1960 |
| WO | 2004011216 | * | 2/2004 |
| WO | 2004011216 A2 | | 2/2004 |

* cited by examiner

*Primary Examiner* — Leszek Kiliman
(74) *Attorney, Agent, or Firm* — Lucas & Mercanti, LLP

(57) ABSTRACT

The invention is directed to the use of a specific class of compounds in the treatment of wood, to a method of treating wood, and to the wood obtained by said method.

The black insoluble polymer which forms after oxidative polymerisation of this class of compounds is able to color the wood through and through in a homogeneous fashion and cannot be rinsed off or leached with water or solvent and is stable upon UV radiation.

In addition it was found that the treated wood of the present invention has a strong resistance against wood degrading fungi.

12 Claims, No Drawings

TREATMENT OF WOOD

This application is a 371 of PCT/NL2007/050658 filed on Dec. 17, 2007, which claims the benefit of European Patent Application No. 06077266.2 filed on Dec. 15, 2006, the contents of each of which are incorporated herein by reference.

The invention is directed to the use of a specific class of compounds in the treatment of wood, to a method of treating wood, and to the wood obtainable by said method.

In order to dye wood satisfactorily, the dyes and pigments that are used for the dying must be able to impregnate the wood well. However, only few dyes and pigments are known that show a good impregnation. The majority of dyes and pigments shows a poor penetration into the wood. The particle size of the dyes or pigments may not allow them to penetrate into the fine structure of the wood, or the dyes or pigments may interact with compounds that are usually present in the wood and form a barrier for further penetration.

Another problem associated with dying of wood is the dark or black dying of wood. Dying wood dark or black generally requires a very high concentration of dyes or pigments, which is hard to achieve for the above-mentioned impregnation difficulties.

In addition, dyes and pigments that have suitable impregnation properties often suffer from leaching and discoloration due to degradation under the influence of water, oxygen and light, in particular UV radiation.

Furthermore, the dyes and pigments of the prior art only color the wood and do not significantly influence any other properties of the wood, such as microbiological resistance, durability, combustion properties and moisture resistance. In order to alter these properties additional compounds are used, such as biocides, polymers, halogen containing fire retardants, and hydrophobic substances like oils or resins. These compounds are brought into the vessels of the wood and often miss the interaction with the cell walls of the wood that would be desirable for an optimal effect. Moreover, these compounds are often sensitive for leaching.

Object of the present invention is to provide a treatment for wood that overcomes one or more of the above-mentioned deficiencies of the prior art.

The inventors now found that this object is met by treatment of the wood with a specific class of compounds. Accordingly, the present invention is directed to the use of heterocyclic compounds which are oxidatively polymerizable having nitrogen or sulfur as the hetero atom, in the treatment of wood.

It has been found that the oxidative polymerisable heterocyclic compounds readily impregnate into the wood. The black insoluble polymer which forms after oxidative polymerisation of these compounds is able to color the wood through and through in a homogeneous fashion.

Surprisingly, the intense black color of the insoluble polymer cannot be rinsed off or leached with water or solvent and is stable upon UV radiation. The oxidative polymerisable heterocyclic compounds for use in the present invention preferably comprises a five or six membered ring with one or two heteroatoms X, wherein X is N (substituted by H or another group) or S, which ring is substituted with one or more moieties selected from H, OH, $NH_2$, carboxyl, aldehyde, methyl, ethyl, propyl, phenyl, or benzyl; which ring may be fused with another 5-, 6- or 7-membered ring, which other 5-, 6- or 7-membered ring, which is substituted with one or more moieties selected from H, OH, $NH_2$, carboxyl, aldehyde, methyl, ethyl, propyl, phenyl, or benzyl.

Preferred oxidative polymerisable heterocyclic compounds for use with the present invention are compounds having the structure of Formula (I):

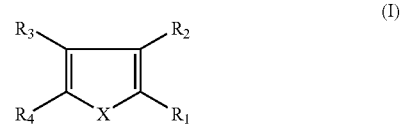

wherein X is N or S; and wherein $R_1$, and $R_2$ each independently are H, OH, $NH_2$, carboxyl, aldehyde, methyl, ethyl, propyl, phenyl, or benzyl; or $R_1$ and $R_2$ can be taken together to form a 5-, 6- or 7-membered ring, preferably a conjugated ring; wherein $R_3$, and $R_4$ independently are H, OH, $NH_2$, carboxyl, aldehyde, methyl, ethyl, propyl, phenyl, or benzyl, or $R_3$ and $R_4$ together form a 5-, 6- or 7-membered ring. Optionally this compound may be further substituted.

The oxidative polymerisable heterocyclic compounds may for instance also be chosen from the group consisting of pyrrole, thiophene, pyridine, quinoline, azole, azulene, diazine, and combinations thereof. These compounds may optionally be substituted, for example by OH, $NH_2$, carboxyl, aldehyde, methyl, ethyl, propyl, phenyl or benzyl moieties. Instead of one of the above-mentioned oxidative polymerisable heterocyclic compounds, it was found that aniline is also a suitable oxidative polymerisable compound in accordance with the present invention, despite the fact that it is not heterocyclic.

A preferred oxidative polymerisable heterocyclic compound is pyrrole, which may optionally be substituted. Examples of substituted pyrrole include 1-methylpyrrole, 2,5-dimethylpyrrole, 1,2,5-trimethylpyrrole, 2-acetylpyrrole, 2-acetyl-1-methylpyrrole, pyrrole-2-carboxaldehyde, and 1-methyl-2-pyrrolecarboxaldehyde. Due to its low molecular weight pyrrole can easily penetrate wood structures and after penetration be polymerized, giving a unique dark color to the wood.

The wood may be chosen from a variety of wood types, including hardwood and softwood. Examples of suitable hardwood types are oak, maple, cherry, birch, ash, poplar and teak. Examples of suitable softwood types are pine, hemlock, fir, redwood, spruce and cedar. Also composite materials like plywood, MDF (medium-density fiberboard) or WPC (wood plastic composites) can be treated successfully in accordance with the present invention.

The present invention is further directed to a method for treating wood comprising the steps of impregnating a piece of wood with the oxidative polymerisable heterocyclic compounds, impregnating the piece of wood with a polymerisation initiator, and performing an in situ polymerisation.

The impregnation step is typically carried out by application of a vacuum-pressure treatment of the wood. This treatment can usually carried out in a standard impregnation vessel at a vacuum over a suitable period, e.g. ranging from 20 minutes to 120 minutes, followed by a pressure treatment van 1-15 bar over a suitable period e.g. for 1-24 hours. This treatment is preferably carried out twice, first with the polymerisable heterocyclic compound and then with the polymerization initiator.

In one embodiment, the wood is first impregnated with the oxidative polymerisable heterocyclic compounds and thereafter with a polymerisation initiator to form the insoluble black polymer.

In another embodiment, the wood is first impregnated with a polymerisation initiator and thereafter with the oxidative polymerisable heterocyclic compounds to form the insoluble black polymer.

The initiator may be any initiator that is capable of polymerizing the heterocyclic compounds as described above and that diffuses easily into the wood structure or at least its diffusion properties are sufficient for impregnating the wood. The initiator is preferably water soluble or soluble in mixtures of water with a polar solvent like methanol, ethanol, acetone, tetrahydrofuran, and the like.

Example of suitable initiators include iron (III) chloride, sodium persulfate, ammonium cerium(IV) nitrate and 2,2'-azobis(2-methylpropionitrile). These initiators can be dissolved in water or mixtures of water and polar solvents and subsequently applied onto the wood for impregnation. Water is the preferred solvent. Suitable concentrations of initiator solutions are for instance from 0.1-5 wt. %, e.g. about 1 wt. %. Pieces of wood in accordance with the present invention, comprise the polymerised polymerisable compound, and optionally traces of the initiator.

In a specific embodiment of the present invention, the polymer is intrinsically doped by the oxidative action of the initiator, which results in cationic charges on the polymer chain. As a result, the polymer becomes electrically conductive. Wood impregnated with such a polymer could be used for instance in shielding of electromagnetic radiation.

As an additional surprising technical effect, it was found that the wood obtainable by the method of the present invention has a strong increase in fungi resistance. Without wishing to be bound by theory, the inventors believe that the insoluble polymer has a conserving effect on the wood.

Accordingly, the use of oxidative polymerisable heterocyclic compounds in the treatment of wood not only leads to an intense coloration of the wood, but also improves the durability of the wood by increasing the fungal resistance. In a laboratory test pieces of spruce ($22 \times 10 \times 5$ mm$^3$) treated with pyrrole and subsequent polymerization by FeCl$_3$ and untreated references were sterilized and placed in a petri dish with malt-agar as a nutrient. The nutrient was covered with a wood degrading fungus that is causing brown rot (*Coniophora puteana*) (cellar fungus). The samples were placed on rings in order to avoid direct contact with the malt agar. After four weeks of exposition in the petri dishes the samples were completely covered by the fungus but no significant mass loss of the wood impregnated with pyrroles was noted. The mass loss (based on the dry mass of the wood) of spruce treated with pyrrole was 0.5% compared to 34% of the untreated spruce references.

The invention will be illustrated by the following non-limiting example.

EXAMPLE

Wood samples (pine sap wood with dimensions: $5 \times 10 \times 22$ mm) were treated in two different ways:

A. A wood sample was immersed in a solution of 5% pyrrole in water during 24 hours at 20° C. at ambient pressure. Subsequently the sample was placed under immersion in a 1% ferric chloride solution (initiator) in water during 24 hours at 20° C. at ambient pressure.

B. A wood sample was immersed in a 1% ferric chloride solution in water during 24 hours at 20° C. at ambient pressure. Subsequently the sample was placed under immersion in a 5% pyrrole solution in water during 24 hours at 20° C. at ambient pressure.

Both these treatments resulted in a distinct black coloration throughout the wood samples.

After drying in air during two weeks, the wood samples were subjected to the following test method in order to assess the susceptibility towards fungi in relation to untreated wood samples of the same origin:

Treated and untreated test-samples ($5 \times 10 \times 22$ mm$^8$) were exposed over an period of 4 weeks to the wood degrading fungus *Coniophora puteana* on malt containing agar petri-dishes (Ø 90 mm, 15 mm high). The climate conditions in the incubator were $22 \pm 1°$ C. and $70 \pm 5\%$ relative humidity. After these four weeks, both the treated and untreated samples were completely covered by the fungi.

After 4 weeks exposition the mass loss [%] of the sample was determined comparing the dry mass of the samples before and after exposure and compared with the untreated samples. The following results were obtained.

| Treatment | A | B | Untreated |
|---|---|---|---|
| Mass loss/[wt. %] | Not detectable | <2 | 31 |

Both treated wood specimen (either with treatment A or B) show a excellent resistance against *C. puteana* after 4 weeks exposure.

The invention claimed is:

1. A method of treating wood comprising impregnating wood with a heterocyclic compound which is polymerizable by oxidation and a polymerization initiator, and
   performing an in situ polymerization,
   wherein said heterocyclic compound is a substituted or unsubstituted pyrrole having a structure according to Formula (I)

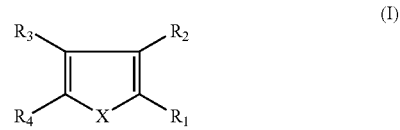

(I)

and
   wherein X is N; and wherein $R_1$ and $R_2$ each independently are H, OH, NH$_2$, carboxyl, aldehyde, methyl, ethyl, propyl, phenyl, or benzyl; wherein $R_3$ and $R_4$ independently are H, OH, NH$_2$, carboxyl, aldehyde, methyl, ethyl, propyl, phenyl or benzyl.

2. A method for improving resistance of wood to degradation caused by fungi comprising impregnating wood with a heterocyclic compound which is polymerizable by oxidation and a polymerization initiator, and
   performing an in situ polymerization,
   wherein said heterocyclic compound is a substituted or unsubstituted pyrrole having a structure according to Formula (I)

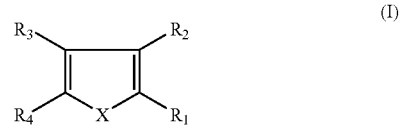

(I)

and wherein X is N; and wherein $R_1$, and $R_2$ each independently are H, OH, $NH_2$, carboxyl, aldehyde, methyl, propyl, phenyl; or benzyl; $R_3$ and $R_4$ independently are H, OH, $NH_2$, carboxyl, aldehyde, methyl, ethyl, propyl, phenyl or benzyl.

3. The method according to claim 1, wherein the wood is first impregnated with the oxidative polymerizable heterocyclic compound and then impregnated with the polymerization initiator; or wherein the wood is first impregnated with the polymerization initiator and then with the oxidative polymerizable heterocyclic compound.

4. The method according to claim 1, wherein said initiator is water soluble or solublein a mixture of water with a polar solvent.

5. The method according to claim 1, wherein the polymerization initiator is selected from the group consisting of: iron(III)chloride, sodium persulfate, ammonium cerium(IV) nitrate, 2,2'-azobis(2-methylpropionitrile) and combinations thereof.

6. Wood comprising a polymerized oxidative polymerizable heterocyclic compound wherein the wood is produced by the method according to claim 1.

7. The method according to claim 1, wherein the pyrrole is selected from the group consisting of 1-methylpyrrole, 2,5-dimethylpyrrole, 1,2,5-trimethylpyrrole, 2-acetylpyrrole, 2-acetyl-1-methylpyrrole, pyrrole-2-carboxaldehyde, 1-methyl-2-pyrrolecarboxaldehyde and combinations thereof.

8. The method according to claim 2, wherein the pyrrole is selected from the group consisting of 1-methylpyrrole, 2,5-dimethylpyrrole, 1,2,5-trimethylpyrrole, 2-acetylpyrrole, 2-acetyl-1-methylpyrrole, pyrrole-2-carboxaldehyde, 1-methyl-2-pyrrolecarboxaldehyde and combinations thereof.

9. The method according to claim 2, wherein the wood is first impregnated with the oxidative polymerizable heterocyclic compound and then impregnated with the polymerization initiator; or wherein the wood is first impregnated with the polymerization initiator and then with the oxidative polymerizable heterocyclic compound.

10. The method according to claim 2, wherein said initiator is water soluble or soluble in a mixture of water with a polar solvent.

11. The method according to claim 2, wherein the polymerization initiator is selected from the group consisting of: iron(III)chloride, sodium persulfate, ammonium cerium(IV) nitrate, 2,2'-azobis(2-methylpropionitrile) and combinations thereof.

12. Wood comprising a polymerized oxidative polymerizable heterocyclic compound wherein the wood is produced by the method according to claim 2.

* * * * *